E. S. COMBS.
TROLLEY.
APPLICATION FILED APR. 8, 1918.

1,336,199.

Patented Apr. 6, 1920.
2 SHEETS—SHEET 1.

Witness
Eric Ischinger.

Inventor
Edgar S. Combs
By Frank Keifer
Attorney

E. S. COMBS.
TROLLEY.
APPLICATION FILED APR. 8, 1918.

1,336,199.

Patented Apr. 6, 1920.
2 SHEETS—SHEET 2.

Witness
Eric Ixchinger.

Inventor
EDGAR S. COMBS

By Frank Keifer
Attorney

UNITED STATES PATENT OFFICE.

EDGAR S. COMBS, OF ROCHESTER, NEW YORK.

TROLLEY.

1,336,199.  Specification of Letters Patent.  Patented Apr. 6, 1920.

Application filed April 8, 1918. Serial No. 227,262.

*To all whom it may concern:*

Be it known that I, EDGAR S. COMBS, a citizen of the United States, residing at Rochester, in the county of Monroe and State of New York, have invented certain new and useful Improvements in Trolleys, of which the following is a specification.

This invention relates to trolley wheels and supports therefor, and its object is to provide a new and improved form of trolley which will always keep in proper alinement with the trolley wire, and hold its place thereon.

With this and other objects in view, this invention comprises a combination and arrangement of parts which will be fully illustrated in the drawings, described in the specification and pointed out in the claims at the end thereof.

Figure 3:
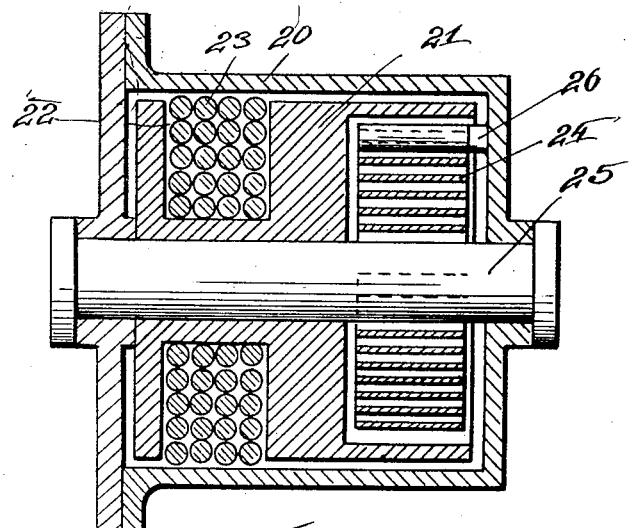

Fig. 3 is a cross section through the winding drum of the trolley rope.

In the several figures of the drawings, like reference numerals indicate like parts.

Figure 1:
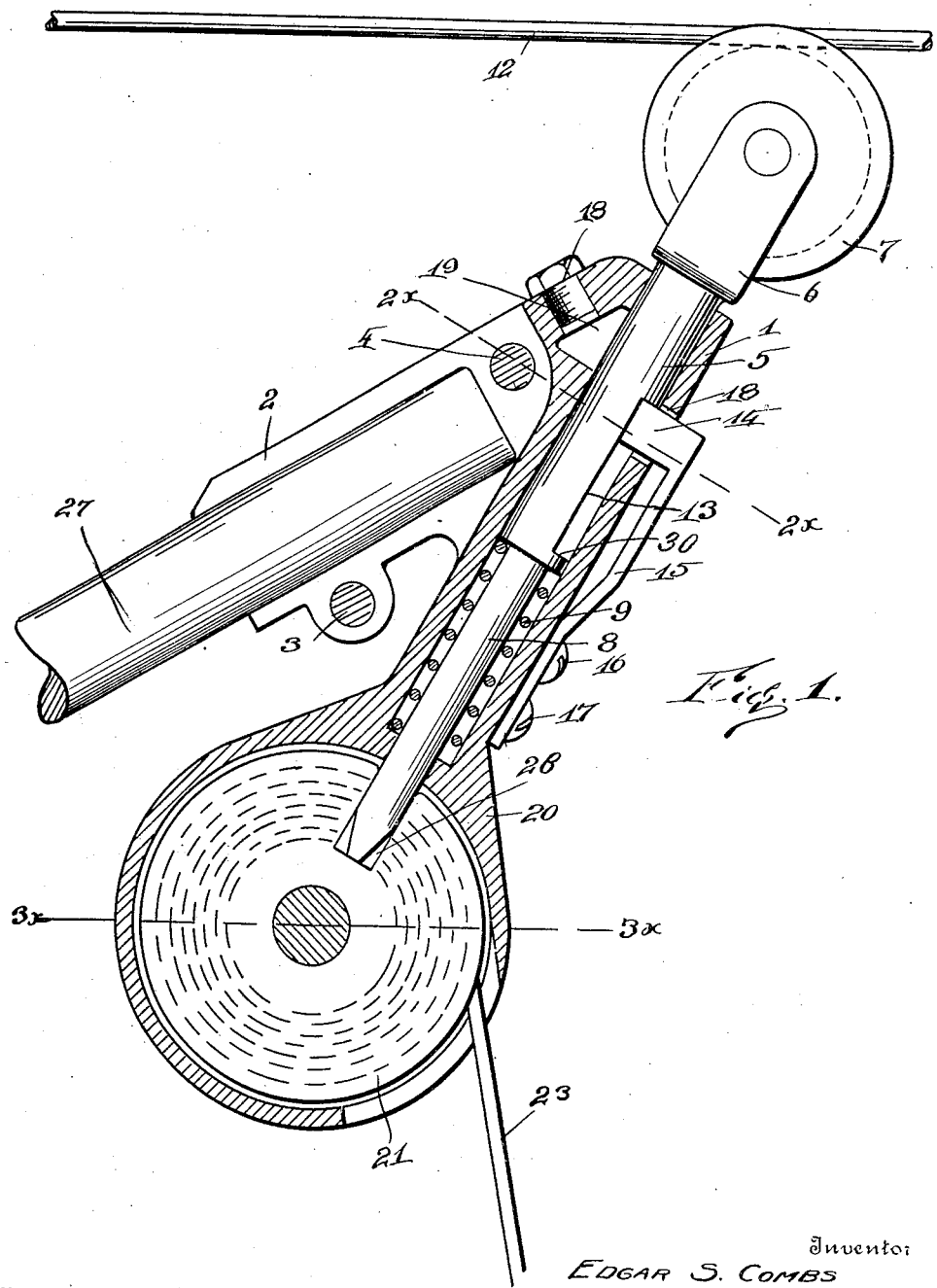
Figure 1 is a longitudinal section through the trolley.
Figure 2:
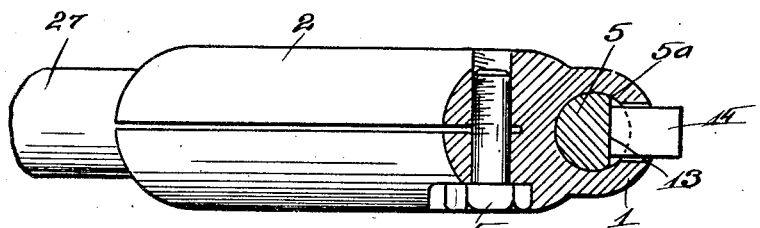
Fig. 2 is a cross section of the trolley taken on the line $2^x$—$2^x$ of Fig. 1.

As shown in Fig. 1 the trolley and its operating mechanism comprises a bracket 1 having a split socket 2 projecting out at the top at an angle therefrom. The end of the trolley pole 27 is adapted to fit into the socket 2 and is clamped in place therein by the clamping screws 3 and 4 which engage both sides of the split socket as shown in Fig. 2 in connection with the screw 4.

The bracket 1 is hollow in the center and forms a sleeve $5^a$ in which the stem 5 is mounted to longitudinally slide therein. The outer end of this stem carries the trolley harp 6 in which the trolley wheel 7 is mounted to rotate.

The lower end of the stem 5 is reduced in diameter to form an extension 8 thereon. This leaves an angular space around the extension in the sleeve $5^a$ into which a compression spring 9 is inserted which is interposed between the bottom of the sleeve $5^a$ and the shoulder 11 formed on the stem 5 at the point where the extension 8 begins.

The compression spring 9 normally forces the stem outwardly and holds the trolley wheel 7 firmly in contact with the trolley wire 12 along the under side of which the trolley wheel is adapted to travel.

In order to keep the wheel 7 in line with the trolley wire 12 when it passes a turnout or switch, the stem 5 on which the trolley wheel is carried, is adapted to turn to either one side or the other according to the direction of the turn-out or switch.

To bring it back to normal position, I provide as follows:

The stem 5 is circular in cross section and readily turns in the circular sleeve $5^a$. A short length of the stem 5 has one side thereof cut away to form the flat surface 13 thereon.

A flat hammer head 14 mounted on the end of the spring 15 is yieldingly held in contact with the flat surface 13 and this normally holds the stem 5 in the pre-determined position in which the trolley wheel 7 is held in alinement with the trolley wire 12 when suspended over a straight stretch of track.

In going around a curve the trolley wheel will turn to one side or the other of the normal line as it follows the wire and the stem 5 will turn with it. In so doing, the hammer head 14 is slightly forced back by the turning of the flat surface 13, but as soon as the wire begins to straighten out, the trolley wheel is forced back into alinement with it by the pressure of the spring 13 which forces the hammer head 14 forward against the flat surface 13 until it rests flat against it. The spring 15 is fastened to the outside of the bracket 1 by means of the screws 16 and 17 which fasten the lower end of the spring to the outside of the bracket in such a manner that the hammer head 14 on the opposite end of the spring 15 projects through the opening 18 into engagement with the flat surface 13 of the stem 5 as previously pointed out.

A reservoir 19 is provided near the top of the bracket which can be filled with a lubricant preferably vaseline. The cup is closed by a plug 18.

The trolley pole 27 is held up by springs in the usual manner and the trolley wheel rises and falls with the trolley wire, due partly to the swinging movement of the trolley pole but mostly to the endwise movement of the pin 5. The parts are so proportioned that the pin will rise and fall with the suspension of the wire but will not move far enough to release the drum 21 until the trolley wheel jumps off of the wire.

The lower end of the bracket 1 has a casing 20 provided thereon. This casing has a drum 21 mounted to rotate therein on which the trolley rope 23 is adapted to be wound up. For this purpose, an annular groove 22 is cut into the drum 21 near one end thereof to receive this rope and provide space for it, so that it can be wound up on it.

The opposite end of the drum 1 is hollowed out and forms a casing into which the spiral spring 24 is placed. This spring has one end thereof fastened to the casing as shown at 25 while the other end is fastened to a suitable stud 26 provided in the stationary casing 20. The central portion of the drum 21 is provided on its periphery with a radial pocket 28 into which the lower end of the extension of the stem 5 is adapted to engage to hold the drum 21 against rotation.

The drum 21 is used for the purpose of pulling the trolley down toward the roof of the car when the trolley wheel has jumped off from the wire.

The spring 9 primarily assists in holding the trolley wheel in contact with the trolley wire by forcing the stem 5 upwardly so that the wheel will follow the wire and keep in contact with it when the wire rises and falls at different points of suspension. Should the trolley wheel jump off from the wire, the spring 9 forces the stem upwardly until the hammer head 14 arrests its movement as it makes contact with the shoulder 30 provided on the end of the flat surface 13. This movement of the stem 5 withdraws the end of the extension 8 from the pocket 26 and releases the drum 21. The spiral spring 24 then rotates the drum 21 and winds up the rope 23 thereon. In doing so, the bracket 1 is pulled down by the winding of the rope until the trolley is brought down below the wire from which it has jumped off, when the wheel may again be brought back in contact with the wire.

I claim.

1. In a trolley the combination of a bracket, a stem mounted to slide and turn in said bracket, a wheel mounted on the end of said stem, a spring operating to force said wheel against a trolley wire, a spring pressed finger held radially to said stem, operating against the side of said stem to hold said stem yieldingly against turning the stem having a long flat surface on the side thereof against which said finger can bear as the stem moves up and down without interfering with the up and down movement of the stem said finger forming a stop for the sliding movement of said stem.

2. In a trolley the combination of a bracket, a stem mounted to slide in said bracket, a flat-surface on said stem, a spring pressed finger held against said flat surface and radially to said stem to yieldingly hold said stem against turning and return said stem to its original position after turning, a wheel mounted on the end of said stem said flat surface being of considerable length to permit an up and down movement of the stem without interfering with the operation of the finger said finger forming a stop for the sliding movement of said stem.

3. In a trolley the combination of a bracket, a stem mounted to slide in said bracket, a flat-surface on said stem, a spring pressed finger held radially against said flat-surface to yieldingly hold said stem against turning and return said stem to its original position after turning and limit the endwise movement of the stem, a wheel mounted on the end of said stem, a drum mounted to rotate on the end of said bracket, a coil spring adapted to rotate said drum in one direction, the end of said stem engaging said drum and hold it against rotation by said spring, a trolley rope attached to said drum, said trolley rope being adapted to be wound up on said drum on the release of said drum by said stem.

4. In a trolley the combination of a bracket, a stem mounted to slide in said bracket, a flat-surface on said stem, a spring pressed finger held against said flat-surface to yieldingly hold said stem against turning and return said stem to its original position after turning said spring pressed finger operating to limit the endwise movement of said stem, a wheel mounted on the end of said stem, and a winding drum carried in the end of said bracket, a rope attached to said drum, means for operating said drum to wind up said rope on the relative movement of said stem to said drum.

In testimony whereof I affix my signature.

EDGAR S. COMBS.